US009791295B2

(12) United States Patent
Nie et al.

(10) Patent No.: US 9,791,295 B2
(45) Date of Patent: Oct. 17, 2017

(54) STEP COUNTING METHOD AND A PEDOMETER BASED ON A 3-AXIS ACCELEROMETER

(71) Applicant: INVENTEC APPLIANCES CORP., New Taipei (TW)

(72) Inventors: Dao-Cai Nie, Jiangxi (CN); Shieng-Ting Kao, Taipei (TW)

(73) Assignee: INVENTEC APPLIANCES CORP., New Taipei (TW)

( * ) Notice: Subject to any disclaimer, the term of this patent is extended or adjusted under 35 U.S.C. 154(b) by 439 days.

(21) Appl. No.: 14/328,326

(22) Filed: Jul. 10, 2014

(65) Prior Publication Data

US 2015/0185044 A1 Jul. 2, 2015

(30) Foreign Application Priority Data

Dec. 31, 2013 (CN) .......................... 2013 1 0754515

(51) Int. Cl.
*G01C 22/00* (2006.01)
(52) U.S. Cl.
CPC ................... *G01C 22/006* (2013.01)
(58) Field of Classification Search
CPC .... G01C 22/006; G01C 21/165; G01C 21/16; G01C 5/06; G01C 5/005; G01C 21/20; G01C 19/5607; G01C 21/206
See application file for complete search history.

(56) References Cited

U.S. PATENT DOCUMENTS

2006/0020177 A1* 1/2006 Seo .................. A61B 5/222
600/300
2009/0133466 A1* 5/2009 Kitamura ............ G01P 21/00
73/1.37

* cited by examiner

Primary Examiner — Roy Y Yi
(74) Attorney, Agent, or Firm — Foster Pepper PLLC

(57) ABSTRACT

The present invention provides a step counting method and a pedometer based on 3-axis accelerometer. The method of the present invention comprises: collecting a 3-axis acceleration; calculating sum of squares for the 3-axis acceleration to generate a standard acceleration; smoothing the standard acceleration to generate a processed acceleration; acquiring maximum and minimum of all processed acceleration during a period, calculating the difference between the maximum and the minimum, and setting a current time window according to the difference; determining whether there are at least three serial processed accelerations decrease progressively; if yes, confirming the collected time for the first processed acceleration of the at least three serial processed accelerations to be a current step starting time; determining whether a time difference between the two serial current step starting time falls within the current time window, if yes, adding step counting. The present invention can enhance the preciseness of step counting.

13 Claims, 3 Drawing Sheets

STEP COUNTING METHOD AND A PEDOMETER BASED ON A 3-AXIS ACCELEROMETER

PRIORITY CLAIM

This application claims the benefit of the filing date of China Patent Application No. 201310754515.6, filed Dec. 31, 2013, entitled "A STEP COUNTING METHOD AND A PEDOMETER BASED ON A 3-AXIS ACCELEROMETER," and the contents of which are hereby incorporated by reference in their entirety.

FIELD OF THE INVENTION

The present invention relates to a field of step counting method and pedometer, and more particularly, to a field of step counting method and pedometer based on 3-axis accelerometer.

BACKGROUND

With rapid development of wearable electronic devices, pedometer has been used widely. Pedometer is a monitor for monitoring exercise progress in daily life. The pedometer can count the steps of a walking person, estimate the distance that person has walked, or calculate calories which is consumed when exercising. Pedometer allows people to conveniently monitor their fitness strength, exercising level and metabolism at any time.

Nowadays, the most common pedometer is based on the accelerometer of a micro electromechanical system. The pedometer collects the acceleration of a user through the accelerometer of the micro electromechanical system. Through the acceleration threshold and predetermined time window, the pedometer determines whether the steps of the user are effective or not according to the changes of the pattern of collected acceleration and the character of steps of exercising humans, which allows the step counting function to be achieved.

SUMMARY OF THE INVENTION

The present invention provides a step counting method and a pedometer based on a 3-axis accelerometer for improving the accuracy of pedometers. As a matter of fact, the exercising pattern and the step size between each user are different, as a result, the step counting methods in the prior art may cause counting errors and reduce the accuracy of the step counting result.

In one aspect of the present invention, a step counting method based on a three-axis accelerometer includes the following steps of: (1) Collecting a three-axis acceleration of a user; (2) Calculating a sum of squares of the three-axis acceleration for generating a standard acceleration; (3) Smoothing the standard acceleration for generating a processed acceleration; (4) Acquiring a maximum and a minimum of all the processed accelerations generated in a period, calculating a difference between the maximum and the minimum, and setting a current time window according to the difference; (5) If there exists three serial processed accelerations decrease progressively, designating the time corresponding to the first processed acceleration of the three serial processed accelerations as a step started time; (6) Calculating a time difference between two serial step started time; and (7) Adding a step count if the time difference is within the current time window.

In another embodiment of the present invention, a pedometer based on a three-axis accelerometer includes a collecting unit, used to collect a three-axis acceleration of a user; a first calculating unit, used to calculate a sum of squares of the collected three-axis acceleration for generating a standard acceleration; a smoothing unit, used to smooth the standard acceleration for generating a processed acceleration; an acquiring unit, used to acquire a maximum and a minimum of all the processed accelerations generated in a period; a second calculating unit, used to calculate a difference between the maximum and the minimum; a setting unit, used to set a current time window according to the difference; a first determining unit, used to determine whether there exists at least three serial processed accelerations decrease progressively; a confirming unit, used to confirm a step started time when the first determining unit determines that there exists three serial processed accelerations decrease progressively, wherein the time corresponds to the first processed acceleration of the three serial processed accelerations is designated as the step started time; a second determining unit, used to determine whether a time difference of two serial step started time is within the current time window; and a step counting unit, used to add a step count if the second determining unit determines that the time difference of the two serial step started time is within the current time window.

In yet another embodiment of the present invention, a pedometer based on a three-axis accelerometer includes a collecting process device, used to collect a three-axis acceleration of a user and process the three-axis acceleration for generating a processed acceleration; an acquiring unit, used to acquire a maximum and a minimum of all the processed accelerations generated in a period; a second calculating unit, used to calculate a difference between the maximum and the minimum; a setting unit, used to set a current time window according to the difference; a first determining unit, used to determine whether there exists at least three serial processed accelerations decrease progressively; a confirming unit, used to confirm a step started time when the first determining unit determines that there exist three serial processed accelerations decrease progressively, wherein the time corresponds to the first processed acceleration of the three serial processed accelerations is designated as the step started time; a second determining unit, used to determine whether a time difference of two serial step started time is within the current time window; and a step counting unit, used to add a step count if the second determining unit determines that the time difference of the two serial step started time is within the current time window.

Many other advantages and features of the present invention will be further understood by the following detailed description and the appended drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
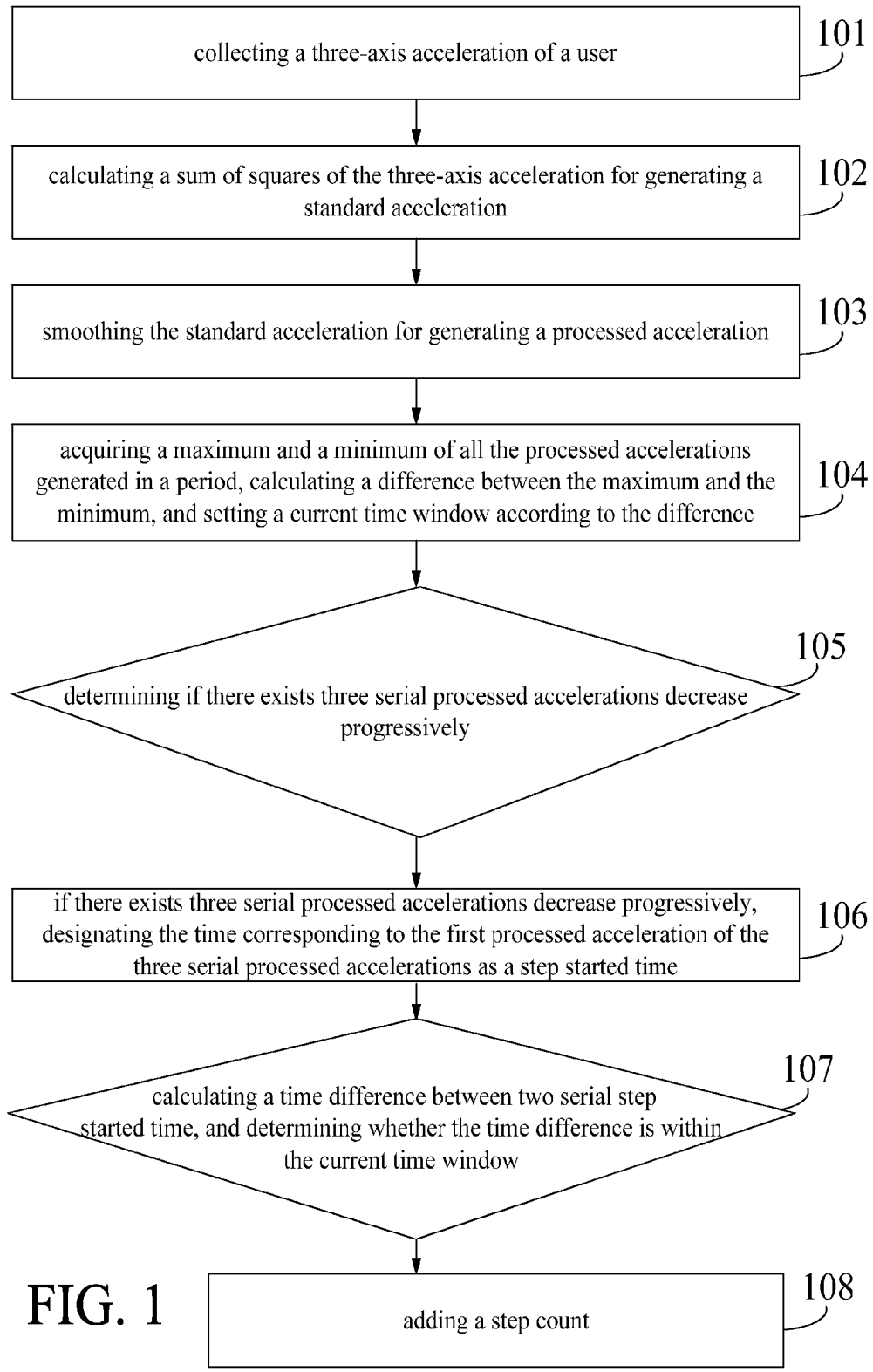
FIG. 1 is a flow chart of a step counting method based on 3-axis accelerometer in the first embodiment of the present invention.

Please refer to FIG. 1. FIG. 1 is a flow chart of a step counting method based on 3-axis accelerometer in the first embodiment of the present invention, wherein the method comprises:

(S101) collecting a three-axis acceleration of a user. An exercising state of a running or walking user can be measured through three directions, wherein the three directions are forward (rolling), upright (yawing), and side direction (pitching movement). Therefore, to detect the exercising state of the user, the 3-axis accelerometer can be used to measure the acceleration of the steps of the user. The 3-axis accelerometer can measure accelerations in three axis, which are X, Y, and Z axis. And the exercising state of the user can be determined according to the measured accelerations.

(S102) calculating a sum of squares of the three-axis acceleration for generating a standard acceleration. Assume the collected accelerations are X, Y, and Z, a formula ($X^2+Y^2+Z^2=a1$) can be used to calculate a standard acceleration, wherein the standard acceleration is $a1$.

(S103) smoothing the standard acceleration for generating a processed acceleration. More specifically, the step of smoothing the standard acceleration for generating a processed acceleration is to calculate the average value of the at least two serial standard acceleration for generating a processed acceleration. In practice, a digital filter is usually used to perform the step of smoothing. The digital filter can use at least two registers to store the standard acceleration calculated above. Then the average value of the two stored serial standard acceleration is calculated for generating a processed acceleration, which makes the variation curve of the processed acceleration smoother. Certainly, performing the smoothing process with more registers, much smoother the variation curve of the processed acceleration will be, nevertheless, a longer response time is also required. In practice, the two register can be selected to store the standard acceleration according to the demand of practical response time and acceleration smoothing level to acquire the best result.

(S104) acquiring a maximum and a minimum of all the processed accelerations generated in a period, calculating a difference between the maximum and the minimum, and setting a current time window according to the difference. The exercising state of the user may change periodically during each period, thus, using an invariable time window to determine the validness of steps during exercise will reduce the accuracy of step counting. Therefore, the time window has to be adjusted according to the variation of the user's exercising state. The step renews the time window according to a time period. The time period can be set according to the sampling rate of the 3-axis accelerometer. For example, the sampling rate of the 3-axis accelerometer is 20 Hz. And the time period can be set as an integral multiples of twenty, such as twenty, forty, sixty, and etc. The time period can also be set as a non-integral multiples of twenty. When the time period is reached, acquiring a maximum and a minimum of all the processed accelerations generated in the period, calculating a difference between the maximum and the minimum, and setting a current time window according to the difference. Therefore, the time window can be renewed periodically.

(S105) determining if there exists three serial processed accelerations decrease progressively.

(S106) if there exists three serial processed accelerations decrease progressively, designating the time corresponding to the first processed acceleration of the three serial processed accelerations as a step started time. Upon receiving many processed accelerations and finishing setting the time window in the time period, the present invention can start to determine whether the user is walking. Through determining whether there exists three serial processed accelerations decrease progressively to determine whether the user is taking a step. And if there exists three serial processed accelerations decrease progressively, it means the user is taking one step. Performing step (S105) continuously to determine the received processed acceleration. While determined the user is taking a step, performing step (S106) to designate the step started time.

(S107) calculating a time difference between two serial steps started times, and determining whether the time difference is within the current time window. If the time difference is within the current time window, step (S108) is performed, which is to add a step count. The step counting method in the prior art use a non-adaptive time window. People believe that while a normal person is walking, the maximum stepping frequency is five steps per second, and the minimum stepping frequency is one step in two seconds. Therefore, the time interval between two effective steps should be within (0.2 second to 2 seconds). As a time window, it is too broad to accurately count the user's steps, some invalid steps may also be included into step count, which will reduce the accuracy of step counting. For determining the validity of steps more accurately, one of the embodiments of the present invention provides a dynamic time window, which is based on the motion pattern of a user while the user is walking or running, wherein the motion pattern, such as stepping frequency of a walking person will not change violently. The dynamic time window is set according to the difference between the maximum and the minimum of all the processed accelerations generated in a period. Therefore, the time window can be varied adaptively in each period. The time window is redetermined periodically according to the practical exercising state of the user. Through the processes mentioned above, the validity of user's steps can be determined more accurate.

Additionally, the step (S108) can comprise: (1) Counting an amount of the processed accelerations acquired between the two serial steps started time; (2) Calculating the time difference between the two serial steps started time according to the counted amount of the processed accelerations and calculating time for acquiring the processed accelerations.

For example, the counted amount of the processed accelerations acquired between the two serial step started time is one thousand; calculating time for acquiring one processed acceleration is 0.5 ms. The time difference can be calculated by multiplying the counted amount by the calculating time for acquiring one processed acceleration, wherein the product is 0.5 s. And then determining whether the time interval 0.5 s falls within the time window or not.

Through the embodiment of the present invention mentioned above, the step counting method based on 3-axis accelerometer of the present invention is shown. The method collects a three-axis acceleration of a user, calculates a sum of squares of the three-axis acceleration for generating a standard acceleration, smoothes the standard acceleration for generating a processed acceleration, and acquires a maximum and a minimum of all the processed accelerations generated in a period, calculates a difference between the maximum and the minimum, and set a current time window according to the difference. In other words, the time window will be adjusted periodically according to the difference between the maximum and the minimum of all the processed accelerations generated in a period, which means the time window can be varied adaptively in different time interval during whole exercising process. The method determines whether there exists three serial processed accelerations decrease progressively or not. If there exists three serial processed accelerations decrease progressively, designating the time corresponding to the first processed acceleration of the three serial processed accelerations as a step started time; if there does not exist three serial processed accelerations decrease progressively, keep determining the processed acceleration. And then the method determines whether the time difference between two serial step started time is within the current time window or not. Finally, adding a step count if the time difference is within the current time window. Therefore, the time window of the present invention can be adjusted according to the exercising pattern of the user, which causes the validity of the steps can be determined more precisely and the accuracy of the pedometer can be improved.

The step counting method based on 3-axis accelerometer in this embodiment of the present invention can improve the accuracy of the pedometer without regarding to which axis of the acceleration should be calculated, the different habit of different people, and the different way to wear the pedometer. Additionally, the step counting method can be applied in every type of 3-axis accelerometer and processing device, which is a simple, convenient, dependable, and low cost method.

The step of setting a current time window according to the difference in step (S104) in the embodiment of the present invention mentioned above can be performed in many ways. And the performing ways are explained as following embodiment.

The first performing way for setting a current time window according to the difference comprises the following steps of: (1) Designing at least two threshold ranges and the corresponding time window; (2) Determining the threshold range which the difference falls within; and (3) Setting the corresponding time window as the current time window range according to the determined threshold range.

In practice, this performing way can design many threshold ranges and the corresponding time window. The time window is able to divide (0.2 s, 2 s) into many subintervals and each subinterval correlates to each threshold range. And determining which threshold range does the difference fall within, then designate the corresponding time window as the current time window.

The second performing way for setting the current time window according to the difference comprises the following steps of: (1) Pre-designing two threshold ranges and the corresponding time window range; (2) Setting the current time window range as [T1,T2] when the difference is within a first threshold range, wherein $0.2 \leq T1 < T2 \leq 2$ s; and (3) Setting the current time window range as [T3,T4] when the difference is within a second threshold range, wherein $T3 > T1$ and $T4 < T2$.

If the difference is big, that means the pace of the user is big during this step. Therefore, the current time window range is set as a small interval as [T1,T2], wherein $0.2 \leq T1 < T2 \leq 2$ s. If the difference is small, that means the pace of the user is small during this step. Therefore, the current time window range is set as a big interval as [T3,T4], wherein $T3 > T1$ and $T4 < T2$.

In practice, the present invention can further measure the velocity and consumed calories of the user during exercising process according to the counted step amount. Therefore, based on the method in the first embodiment mentioned above, the method mentioned above can further comprises: sending a step counting data to a terminal device for the terminal device to evaluate the user's exercising state according to the step counting data.

The step counting method based on 3-axis accelerometer in the embodiment of the present invention mentioned above can follow a counting rule illustrated as following: the counting rule comprises two working modes, which are detecting mode and confirming mode. The counting rule is started from the detecting mode. When there exists M effective steps, entering the confirming mode and accumulating the M effective steps into the total steps counting, wherein M is an integer, and $M \geq 3$. In the confirming mode, adding one step count if one effective step is detected. But if an invalidated step is detected in the confirming mode, return to the detecting mode and restart the detection until there are M effective steps being detected again.

Figure 2:
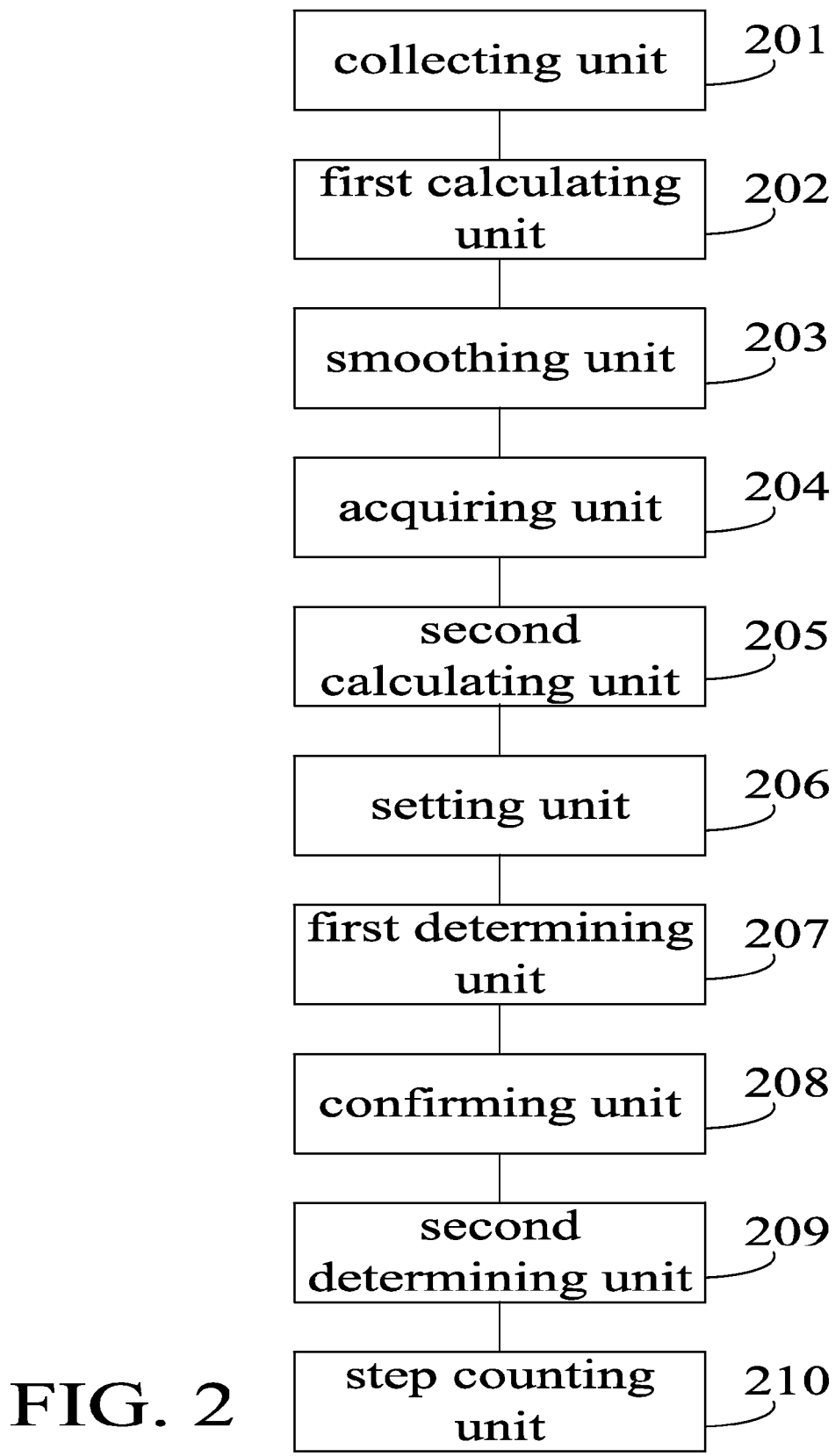
FIG. 2 is a structure diagram of a pedometer based on 3-axis accelerometer in the first embodiment of the present invention.

The embodiment of the present invention further provides a pedometer based on 3-axis accelerometer corresponding to the first embodiment mentioned in the above method. Please refer to FIG. 2. FIG. 2 is a structure diagram of a pedometer based on 3-axis accelerometer in the first embodiment of the present invention. The pedometer based on a three-axis accelerometer comprises: a collecting unit 201, a first calculating unit 202, a smoothing unit 203, an acquiring unit 204, a second calculating unit 205, a setting unit 206, a first determining unit 207, a confirming unit 208, a second determining unit 209 and a step counting unit 210. The following statement will illustrate the working theory and the connecting relationship of the pedometer: (1) The Collecting unit 201 is used to collect a three-axis acceleration of a user; (2) The first calculating unit 202 is used to calculate a sum of squares of the collected three-axis acceleration for generating a standard acceleration; (3) The smoothing unit 203 is used to smooth the standard acceleration for generating a processed acceleration; (4) The acquiring unit 204 is used to acquire a maximum and a minimum of all the processed accelerations generated in a period; (5) The second calculating unit 205 is used to calculate a difference between the maximum and the minimum; (6) The setting unit 206 is used to set a current time window according to the difference; (7) The first determining unit 207 is used to determine whether there exists at least three serial processed accelerations decrease progressively; (8) The confirming unit 208 is used to confirm a step started time when the first determining unit determines that there exist three serial processed accelerations decrease progressively, wherein the time corresponds to the first processed acceleration of the three serial processed accelerations is designated as the step started time; (9) The second determining unit 209 is used to determine whether a time difference of two serial step started time is within the current time window; and (10) The step counting unit 210 is used to add a step count if the second determining unit determines that the time difference of the two serial step started time is within the current time window.

Furthermore, a 3-axis pedometer can work as the collecting unit.

Additionally, the setting unit can comprise: (1) A first design module, used to design at least two threshold ranges and the corresponding time window; (2) A first determining module, used to determine the threshold range which the difference falls within; and (3) A first setting module, used to set the corresponding time window as the current time window according to the determined threshold range.

Additionally, the setting unit can comprise: (1) A second design module, used to design two threshold ranges and the corresponding time window; (2) A second setting module, used to set the current time window as [T1,T2] when the difference is within a first threshold range, wherein $0.2 s \leq T1 < T2 \leq 2 s$; and (3) A third setting module, used to set the current time window as [T3,T4] when the difference is within a second threshold range, wherein $T3 > T1$ and $T4 < T2$.

The second determining unit can comprise: (1) A counting module, used to count an amount of the processed accelerations acquired between the two serial steps started time; (2) A calculating module, used to calculate the time difference between the two serial step started time according to the counted amount of the processed accelerations and calculate time for acquiring the processed accelerations; and (3) A determining module, used to determine whether the time difference is within the current time window.

The pedometer can further comprise: (1) A sending unit, used to send a step counting data to a terminal device for the terminal device to evaluate the user's exercising state according to the step counting data.

In practice, to further enhance the reliability of the pedometer, the step counting unit of the pedometer can count steps by the following counting rule practically. The counting rule comprises two working modes, which are detecting mode and confirming mode. The counting rule is started from the detecting mode. When there exists M effective steps, entering the confirming mode and accumulating the M effective steps into the total steps counting, wherein M is an integer, and $M \geq 3$. In the confirming mode, adding one step count if one effective step is detected. But if an invalidated step is detected in the confirming mode, return to the detecting mode and restart the detection until there are M effective steps being detected again.

The embodiment of the present invention further provides the hardware constituent of the pedometer comprising at least one processor (such as CPU), at least one network interface or other communication interfaces, memory, and at least one communication bus-bar, for allowing the devices to connect and communicate with each other. The processor is used to perform the performable module stored in the memory, such as computer program. The memory can be a Volatile Memory, such as Random-Access Memory, RAM. The memory also can be a Non-Volatile Memory, such as Read-Only Memory, ROM, Flash Memory, Hard Disk Drive, HDD, or Solid-State Drive, SSD. The processor is used to perform the performable command stored in the memory, and the applied function and data processing can be performed concurrently. The communication bus-bar is used to allow the devices to connect and communicate with each other. Through the at least one network interface (which can be wired or wireless), the system gateway can communicate with at least one other network unit, which can use internet, wide area network, local network, or metro network.

Figure 3:
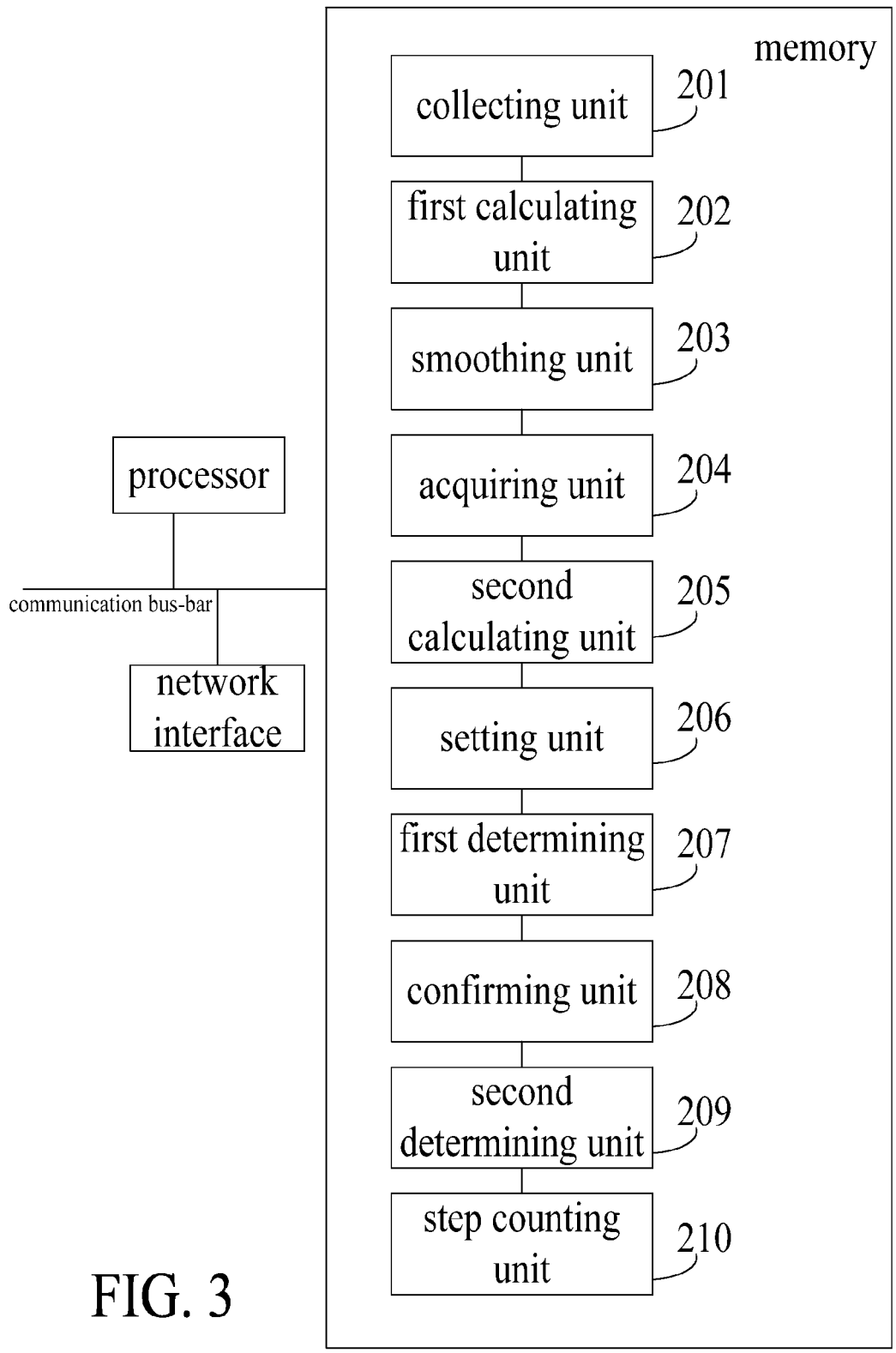
FIG. 3 is a hardware constituent diagram of a pedometer based on 3-axis accelerometer of the present invention.

Please refer to FIG. 3. FIG. 3 is a hardware constituent diagram of a pedometer based on 3-axis accelerometer of the present invention. There is program command stored in the memory of the pedometer. The program command can be performed by processor. The program command comprises collecting unit 201, first calculating unit 202, smoothing unit 203, acquiring unit 204, second calculating unit 205, setting unit 206, first determining unit 207, confirming unit 208, second determining unit 209, and step counting unit 210. And the embodiment of each unit mentioned above has been shown in FIG. 2.

Because MEMS transducer has advantages of low cost, small scale, and low power consumption, more and more portable consuming electronic equipment starts to integrate the function of pedometer. For example, music player and cell phone both can integrate the pedometer mentioned above and count the steps of the user through the pedometer. According to the counted steps of the user, the distance that the user has walked can be estimated, or the calories which are consumed through exercising can be calculated.

A case of the present invention can be explained in the normal statement of the computer performable command, such as a program unit. Normally, the program unit is capable of performing specific mission or achieving routine, program, object, unit, or data constituent of specific abstract data type. The case of the present invention can also be achieved in a distributed computing system, wherein the mission can be performed by remote processing equipment which is connected through communication network. In this distributed computing system, the program unit can be located in the storage medium of local or remote computer, wherein the local or remote computer comprises a storage device.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A step counting method based on a three-axis accelerometer, comprising the following steps of:
   collecting a three-axis acceleration of a user;
   calculating a sum of squares of the three-axis acceleration for generating a standard acceleration;
   smoothing the standard acceleration for generating a processed acceleration;
   acquiring a maximum and a minimum of all the processed accelerations generated in a period, and calculating a difference between the maximum and the minimum;
   pre-designing two threshold ranges and a corresponding time window range;
   setting the current time window range as [T1,T2] when the difference is within a first threshold range, wherein $0.2 s \leq T1 < T2 \leq 2 s$;
   setting the current time window range as [T3,T4] when the difference is within a second threshold range, wherein $T3 > T1$ and $T4 < T2$;
   if there exists three serial processed accelerations decrease progressively, designating the time corresponding to the first processed acceleration of the three serial processed accelerations as a step started time;

calculating a time difference between two serial step started time; and adding a step count if the time difference is within the current time window.

2. The method of claim 1, wherein the step of setting the current time window according to the difference comprises the following steps of:

designing at least two threshold ranges and the corresponding time window;

determining the threshold range which the difference falls within; and setting the corresponding time window as the current time window according to the determined threshold range.

3. The method of claim 1, wherein the step of calculating the time difference between two serial step started time comprises the following steps of:

counting an amount of the processed accelerations acquired between the two serial step started time; and calculating the time difference between the two serial steps started time according to the counted amount of the processed accelerations and calculating time for acquiring the processed accelerations.

4. The method of claim 1, further comprising the following steps of:

sending a step counting data to a terminal device for the terminal device to evaluate the user's exercising state according to the step counting data.

5. A pedometer based on a three-axis accelerometer, comprising:

a collecting unit, used to collect a three-axis acceleration of a user;

a first calculating unit, used to calculate a sum of squares of the collected three-axis acceleration for generating a standard acceleration;

a smoothing unit, used to smooth the standard acceleration for generating a processed acceleration;

an acquiring unit, used to acquire a maximum and a minimum of all the processed accelerations generated in a period;

a second calculating unit, used to calculate a difference between the maximum and the minimum;

a setting unit, used to set a current time window according to the difference, the setting unit further comprising:

a second design module, used to design two threshold ranges and the corresponding time window;

a second setting module, used to set the current time window as [T1,T2] when the difference is within a first threshold range, wherein 0.2 s≤T1<T2≤2 s; and a third setting module, used to set the current time window as [T3,T4] when the difference is within a second threshold range, wherein T3>T1 and T4<T2;

a first determining unit, used to determine whether there exists at least three serial processed accelerations decrease progressively;

a confirming unit, used to confirm a step started time when the first determining unit determines that there exist three serial processed accelerations decrease progressively, wherein the time corresponds to the first processed acceleration of the three serial processed accelerations is designated as the step started time;

a second determining unit, used to determine whether a time difference of two serial step started time is within the current time window; and a step counting unit, used to add a step count if the second determining unit determines that the time difference of the two serial step started time is within the current time window.

6. The pedometer of claim 5, wherein the setting unit comprises:

a first design module, used to design at least two threshold ranges and the corresponding time window;

a first determining module, used to determine the threshold range which the difference falls within; and a first setting module, used to set the corresponding time window as the current time window according to the determined threshold range.

7. The pedometer of claim 5, wherein the second determining unit comprises:

a counting module, used to count an amount of the processed accelerations acquired between the two serial steps started time;

a calculating module, used to calculate the time difference between the two serial step started time according to the counted amount of the processed accelerations and calculate time for acquiring the processed accelerations; and a determining module, used to determine whether the time difference is within the current time window.

8. The pedometer of claim 5, further comprising:

a sending unit, used to send a step counting data to a terminal device for the terminal device to evaluate the user's exercising state according to the step counting data.

9. A pedometer based on a three-axis accelerometer, comprising:

a collecting process device, used to collect a three-axis acceleration of a user and process the three-axis acceleration for generating a processed acceleration;

an acquiring unit, used to acquire a maximum and a minimum of all the processed accelerations generated in a period;

a second calculating unit, used to calculate a difference between the maximum and the minimum;

a setting unit, used to set a current time window according to the difference, the setting unit further comprising:

a second design module, used to design two threshold ranges and the corresponding time window;

a second setting module, used to set the current time window as [T1,T2] when the difference is within a first threshold range, wherein 0.2 s≤T1<T2≤2 s; and a third setting module, used to set the current time window as [T3,T4] when the difference is within a second threshold range, wherein T3>T1 and T4<T2;

a first determining unit, used to determine whether there exists at least three serial processed accelerations decrease progressively;

a confirming unit, used to confirm a step started time when the first determining unit determines that there exist three serial processed accelerations decrease progressively, wherein the time corresponds to the first processed acceleration of the three serial processed accelerations is designated as the step started time;

a second determining unit, used to determine whether a time difference of two serial step started time is within the current time window; and a step counting unit, used to add a step count if the second determining unit determines that the time difference of the two serial step started time is within the current time window.

10. The pedometer of claim 9, wherein the setting unit comprises:

a first design module, used to design at least two threshold ranges and the corresponding time window;

a first determining module, used to determine the threshold range which the difference falls within; and a first setting module, used to set the corresponding time window as the current time window according to the determined threshold range.

11. The pedometer of claim 9, wherein the second determining unit comprises:

a counting module, used to count the amount of the processed acceleration acquired between the two serial steps started time;

a calculating module, used to calculate the time difference between the two serial step started time according to the counted amount of the processed acceleration and calculating time for getting the processed acceleration; and a determining module, used to determining whether the time difference is within the current time window range.

12. The pedometer of claim 9, further comprising:

a sending unit, used to send a step counting data to a terminal device for the terminal devices to evaluate the user's exercising state according to the step counting data.

13. The pedometer of claim 9, wherein the collecting process device comprises:

a collecting unit, used to collect the three-axis acceleration of the user;

a first calculating unit, used to calculate a sum of squares of the collected three-axis acceleration for generating a standard acceleration; and a smoothing unit, used to smooth the standard acceleration for generating a processed acceleration.

* * * * *